US010223560B2

(12) United States Patent
Boles et al.

(10) Patent No.: US 10,223,560 B2
(45) Date of Patent: Mar. 5, 2019

(54) COORDINATED ILLUMINATION AND IMAGE SIGNAL CAPTURE FOR ENHANCED SIGNAL DETECTION

(71) Applicant: Digimarc Corporation, Beaverton, OR (US)

(72) Inventors: Jacob L. Boles, Portland, OR (US); Alastair M. Reed, Lake Oswego, OR (US); John D. Lord, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/687,153

(22) Filed: Aug. 25, 2017

(65) Prior Publication Data

US 2018/0039805 A1 Feb. 8, 2018

Related U.S. Application Data

(63) Continuation of application No. 13/964,014, filed on Aug. 9, 2013, now Pat. No. 9,749,607, which is a continuation-in-part of application No. 13/011,618, filed on Jan. 21, 2011, now Pat. No. 8,805,110, which
(Continued)

(51) Int. Cl.
*G06K 9/00* (2006.01)
*G06K 7/10* (2006.01)
(Continued)

(52) U.S. Cl.
CPC ... *G06K 7/10722* (2013.01); *G06F 17/30879* (2013.01); *G06K 7/12* (2013.01);
(Continued)

(58) Field of Classification Search
None
See application file for complete search history.

(56) References Cited

U.S. PATENT DOCUMENTS 6,069,696 A 5/2000 McQueen et al.
6,363,366 B1 3/2002 Henty
(Continued)

FOREIGN PATENT DOCUMENTS

FR 2905185 2/2008
WO WO2008152922 12/2008
(Continued)

OTHER PUBLICATIONS

International Search Report and Written Opinion dated Oct. 24, 2014 from PCT/US2014/041417.
(Continued)

*Primary Examiner* — Hadi Akhavannik
(74) *Attorney, Agent, or Firm* — Digimarc Corporation (57) ABSTRACT

Signal detection and recognition employees coordinated illumination and capture of images under to facilitate extraction of a signal of interest. Pulsed illumination of different colors facilitates extraction of signals from color channels, as well as improved signal to noise ratio by combining signals of different color channels. The successive pulsing of different color illumination appears white to the user, yet facilitates signal detection, even for lower cost monochrome sensors, as in barcode scanning and other automatic identification equipment.

20 Claims, 5 Drawing Sheets

Related U.S. Application Data is a continuation of application No. PCT/US2009/054358, filed on Aug. 19, 2009, said application No. 13/964,014 is a continuation-in-part of application No. 13/888,939, filed on May 7, 2013, now Pat. No. 9,008,315, which is a continuation-in-part of application No. 13/745,270, filed on Jan. 18, 2013, now Pat. No. 8,879,735.

(60) Provisional application No. 61/226,195, filed on Jul. 16, 2009.

(51) Int. Cl.
| | |
|---|---|
| *G06K 9/20* | (2006.01) |
| *H04N 1/48* | (2006.01) |
| *H04N 1/40* | (2006.01) |
| *G06F 17/30* | (2006.01) |
| *G06K 7/12* | (2006.01) |
| *H04N 5/225* | (2006.01) |
| *H04N 9/73* | (2006.01) |
| *G06K 7/14* | (2006.01) |
| *H04N 5/33* | (2006.01) |

(52) U.S. Cl.
CPC .......... *G06K 7/1413* (2013.01); *G06K 9/209* (2013.01); *G06K 9/2018* (2013.01); *G06K 9/2027* (2013.01); *H04N 1/40056* (2013.01); *H04N 1/482* (2013.01); *H04N 5/2256* (2013.01); *H04N 5/33* (2013.01); *H04N 9/73* (2013.01)

(56) References Cited

U.S. PATENT DOCUMENTS

| | | |
|---|---|---|
| 6,466,961 B1 | 10/2002 | Miller |
| 6,590,996 B1 | 7/2003 | Reed et al. |
| 6,721,440 B2 | 4/2004 | Reed et al. |
| 6,763,123 B2 | 7/2004 | Reed et al. |
| 6,948,068 B2 | 9/2005 | Lawandy et al. |
| 7,184,569 B2 | 2/2007 | Lawandy et al. |
| 7,213,757 B2 | 5/2007 | Jones et al. |
| 7,319,990 B1 | 1/2008 | Henty |
| 7,364,085 B2 | 4/2008 | Jones |
| 7,393,119 B2 | 7/2008 | Lebens et al. |
| 7,420,663 B2 | 9/2008 | Wang et al. |
| 7,529,385 B2 | 5/2009 | Lawandy et al. |
| 7,667,766 B2 | 2/2010 | Lee et al. |
| 7,738,673 B2 | 6/2010 | Reed |
| 7,938,331 B2 | 5/2011 | Brock et al. |
| 7,963,450 B2 | 6/2011 | Lawandy et al. |
| 7,995,911 B2 | 8/2011 | Butterworth |
| 8,027,509 B2 | 9/2011 | Reed et al. |
| 8,224,018 B2 | 7/2012 | Rhoads et al. |
| 8,284,279 B2 | 10/2012 | Park et al. |
| 8,358,089 B2 | 1/2013 | Hsia et al. |
| 8,364,031 B2 | 1/2013 | Geffert et al. |
| 8,385,971 B2 | 2/2013 | Rhoads et al. |
| 8,888,207 B2 | 11/2014 | Furness, III et al. |
| 9,179,033 B2 | 11/2015 | Reed et al. |
| 9,692,984 B2 | 6/2017 | Lord |
| 9,727,941 B1 | 8/2017 | Falkenstern et al. |
| 9,749,607 B2 * | 8/2017 | Boles ............... H04N 1/40056 |
| 2002/0001080 A1 | 1/2002 | Miller et al. |
| 2002/0012461 A1 | 1/2002 | MacKinnon |
| 2002/0121590 A1 | 9/2002 | Yoshida |
| 2004/0197816 A1 | 10/2004 | Empedocles et al. |
| 2004/0239528 A1 | 12/2004 | Luscombe |
| 2004/0263911 A1 | 12/2004 | Rodriguez et al. |
| 2005/0011956 A1 | 1/2005 | Carlson |
| 2005/0030416 A1 | 2/2005 | Kametani et al. |
| 2005/0030533 A1 | 2/2005 | Treado |
| 2005/0156048 A1 | 7/2005 | Reed |
| 2006/0008112 A1 | 1/2006 | Reed |
| 2006/0133061 A1 | 6/2006 | Maeda |
| 2006/0161788 A1 | 7/2006 | Turpin et al. |
| 2006/0198551 A1 | 9/2006 | Abe et al. |
| 2006/0202028 A1 | 9/2006 | Rowe et al. |
| 2006/0251408 A1 | 11/2006 | Konno |
| 2007/0108284 A1 | 5/2007 | Pankow |
| 2007/0143232 A1 | 6/2007 | Auslander et al. |
| 2007/0217689 A1 | 9/2007 | Yang et al. |
| 2007/0268481 A1 | 11/2007 | Raskar |
| 2008/0101657 A1 | 5/2008 | Durkin et al. |
| 2008/0112596 A1 | 5/2008 | Rhoads et al. |
| 2008/0133389 A1 | 6/2008 | Schowengerdt et al. |
| 2008/0177185 A1 | 7/2008 | Nakao et al. |
| 2008/0297644 A1 | 12/2008 | Farchtchian et al. |
| 2009/0067695 A1 | 3/2009 | Komiya et al. |
| 2009/0086506 A1 | 4/2009 | Okumura |
| 2009/0112101 A1 | 4/2009 | Furness, III et al. |
| 2009/0243493 A1 | 10/2009 | Bergquist |
| 2010/0042004 A1 | 2/2010 | Dhawan |
| 2010/0048242 A1 | 2/2010 | Rhoads et al. |
| 2010/0073504 A1 | 3/2010 | Park et al. |
| 2010/0142003 A1 | 6/2010 | Braun et al. |
| 2010/0150396 A1 | 6/2010 | Reed |
| 2010/0150434 A1 | 6/2010 | Reed |
| 2010/0200658 A1 | 8/2010 | Olmstead et al. |
| 2010/0208240 A1 | 8/2010 | Schowengerdt et al. |
| 2011/0007935 A1 | 1/2011 | Reed et al. |
| 2011/0037873 A1 | 2/2011 | Hu |
| 2011/0098029 A1 | 4/2011 | Rhoads et al. |
| 2011/0123185 A1 | 5/2011 | Clark |
| 2011/0212717 A1 | 9/2011 | Rhoads et al. |
| 2011/0304705 A1 | 12/2011 | Kantor et al. |
| 2012/0243009 A1 | 9/2012 | Chapman et al. |
| 2012/0321759 A1 | 12/2012 | Marinkovich et al. |
| 2013/0126618 A1 | 5/2013 | Gao |
| 2013/0195273 A1 | 8/2013 | Lord |
| 2013/0308045 A1 | 11/2013 | Rhoads et al. |
| 2013/0329006 A1 | 12/2013 | Boles et al. |
| 2013/0335783 A1 | 12/2013 | Kurtz |
| 2014/0085534 A1 | 3/2014 | Bergquist |
| 2014/0293091 A1 | 10/2014 | Rhoads et al. |

FOREIGN PATENT DOCUMENTS

| | | |
|---|---|---|
| WO | WO2012047340 | 4/2012 |
| WO | WO2013109934 | 7/2013 |

OTHER PUBLICATIONS

International Search Report and Written Opinion dated Nov. 4, 2014 from PCT/US2014/050573.
Willis et al., "InfraStructures", ACM Transactions on Graphics, vol. 32, No. 4, Jul. 1, 2013.
Silverbrook Research U.S. Appl. No. 61/350,013, filed May 31, 2010.
Office Action dated Jul. 17, 2013, in U.S. Appl. No. 13/444,521.
Park, et al, Multispectral imaging using multiplexed illumination, 11th IEEE Int'l Conf on Computer Vision, 2007.
Bolle, et al, VeggieVision: A Produce Recognition System, 1996.
Chi, et al, Multi-spectral imaging by optimized wide band illumination, International Journal of Computer Vision 86.2-3 (2010), pp. 140-151.
Everdell, et al, Multispectral imaging of the ocular fundus using LED illumination, European Conference on Biomedical Optics, Optical Society of America, 2009.
Nieves, et al., Multispectral synthesis of daylight using a commercial digital CCD camera, Applied Optics 44.27 (2005): 5696-5703.
Park, et al., Multispectral imaging using multiplexed illumination, IEEE Int'l Conf on Computer Vision, 2007.
Schockling, et al, Visualization of hyperspectral images, SPIE Defense, Security, and Sensing, 2009.
U.S. Appl. No. 15/670,863, filed Aug. 7, 2017.

* cited by examiner

COORDINATED ILLUMINATION AND IMAGE SIGNAL CAPTURE FOR ENHANCED SIGNAL DETECTION

RELATED APPLICATION DATA

This application is a continuation of U.S. patent application Ser. No. 13/964,014, filed Aug. 9, 2013 (now U.S. Pat. No. 9,749,607) which is a continuation in part of U.S. patent application Ser. No. 13/011,618, filed Jan. 21, 2011 (now U.S. Pat. No. 8,805,110), which is a continuation of PCT application PCT/US09/54358, filed Aug. 19, 2009 (published as WO2010022185). Application PCT/US09/54358 claims priority benefit to 61/226,195, filed 16 Jul. 2009. Application Ser. No. 13/964,014 is also a continuation in part of U.S. patent application Ser. No. 13/888,939, filed May 7, 2013 (now U.S. Pat. No. 9,008,315), which is a continuation-in-part of co-pending application Ser. No. 13/745,270, filed Jan. 18, 2013 (now U.S. Pat. No. 8,879,735). These applications are hereby incorporated by reference.

TECHNICAL FIELD

The invention relates to image signal capture and processing, as this processing is used in conjunction with associated image-based signal encoding and decoding, image recognition and object recognition.

BACKGROUND AND SUMMARY

Conventional barcode scanners use single color illumination consisting of a red light emitting diode (LED). This minimizes the cost of the scanner but limits the range of colors that can be used in the printed barcode and be detected with the scanner. A similar problem occurs when using the scanner to read digital watermarks.

While conventional barcode scanners typically use red illumination, newer barcode scanners are increasingly moving to white LEDs as illumination for their sensors as opposed to the traditional red LED illumination. The rationale behind this change is that red illumination can be more stressful on the eyes when used for long periods. Red is also more distracting because it does not blend in with the natural ambient light in the room. However, to save on costs the scanner manufactures maintain a monochrome sensor on their scanning devices. The combination of a monochrome sensor and only white illumination means that only a luminance changes can be detected by the scanner as opposed to changes in chrominance, such as changes in blue color direction in the chrominance plane, when using red illumination.

Thus, when implementing image signal coding in scanning hardware with white illumination and a monochrome sensor, the use of color to convey data signals is more limited, as the monochrome sensor will only capture luminance changes under white illumination. For digital watermarking applications where imperceptibility is important, digital watermarks encoded by modulating luminance tend not to be acceptable as they can be more visible than those encoded by modulating chrominance. Where imperceptibility of the data signal encoded in the image is more important, it is preferred to encode the data signal by modulating one or more colors in a chrominance plane. Even where limited to encoding in luminance, color values in an image can be modulated so as to impart a signal in luminance. These color values have luminance and chrominance components, and luminance is modulated by scaling a color vector to increase or decrease its luminance component. See, for example, U.S. Pat. No. 6,590,996, where color values of image signals are adaptively modulated to have reduced visibility yet yield detectable modulation of luminance.

By increasing the number of color LED's used in image capture, a greater range of printed colors can be used in printed barcodes or digital watermarks. This has the added benefit of enabling encoding of auxiliary data signals in a chrominance plane. In particular, to reduce visibility of digital watermarks in host images, digital watermark encoding is performed in one or more colors within a chrominance plane (also called color planes, color channels or color direction). For example, one such approach modulates a host image primarily in the cyan channel to greatly reduce the visibility of the embedded watermark. Further, encoding signals in multiple chrominance channels provides additional benefits in imperceptibility, robustness and detection. An example is encoding out-of-phase signals in at least two chrominance channels. In CMYK printing, for example, changes for encoding digital signals are introduced in the Cyan and Magenta ink channels, and these changes are detected in red and green channels. Cover image content is reduced by subtracting the chrominance channels in a detector. See U.S. Pat. No. 8,199,969, and US Patent Application Publication 20100150434, which are hereby incorporated by reference. In these types of techniques, the use of color LED's in the scanner enables the watermark signals to be extracted and combined from two or more chrominance channels.

The addition of illumination in other wavelengths enables scanners to be used to read still further types of signals. For example, a color near infra-red (NIR) LED could be added to read signals encoded in the K channel in objects printed with CMYK printers. This allows the scanning equipment to exploit out-of-phase encoding in which one of the signals is encoded in the K channel and an out-of-phase signal is encoded in an opposite direction by scaling luminance of CMY channels to offset the change in luminance in the K channel. This out-of-phase encoding reduces visibility as the luminance changes encoded in the K channel are offset by the luminance changes in the CMY channels. CMY inks are transparent to NIR, so the digital watermark is read from K channel by capturing the image under illumination of the NIR LED. See, for example, U.S. Pat. Nos. 6,721,440 and 6,763,123, which are hereby incorporated by reference.

Scanners that use white illumination and a monochrome sensor normally will not be able to detect signals encoded in these other channels. Instead, only encoding in luminance is detectable. This may be suitable for some applications. However, where the data signaling is preferably implemented to minimize visible changes to the host image, luminance watermarking tends to be inferior to chrominance watermarking. From the standpoint of the sensitivity of the human visual system, changes to certain colors in chrominance channels are less noticeable to humans than changes in luminance.

In order to detect with white illumination, manufacturers need to update their scanners to a color sensor or some other means to separate color components of the captured image. For lower cost scanners, a full color video sensor adds cost to the scanner and triples the bandwidth of data from the sensor to the detector (e.g., every frame typically consists of 3 or more components (such as RGB), as opposed to a single component in monochrome sensors).

To provide a broader range of signal capture, one solution is to have a series of different wavelength light sources (e.g., LEDs) that are synchronized to the capture of frames by a monochrome sensor. This allows frames to be illuminated by a single wavelength. For some types of image based data codes, like digital watermarks that are repeated across the surface of a printed object, it is sufficient to illuminate a chrominance based watermark signal for a portion of a frame, as the data signal is fully recoverable from a portion of the frame. If these light sources are flashed quickly enough, they give the illusion to the user of white illumination. When the combination of different wavelength light sources are flashed fast enough (e.g., 200 Hz or more), the illumination appears white with no visible flashing or blinking perceived by the user. This type of controlled lighting can be used in combination with a monochrome sensor and yet capture chrominance information to detect or recognize signals in chrominance channels. As long as acquisition time can be short, the periods for illuminating the sources of different wavelengths can be configured to synch to multiples of the video rate. Various examples of configurations of lighting and capture are provided below.

While the above discussion primarily provides examples of digital watermark and barcode signaling, the techniques can be applied to other forms of image based coding and scanning of such coding from objects. Further, the techniques also apply to signal recognition in visual media, such as pattern recognition, computer vision, image recognition and video recognition. Various objects, such as goods or packaging for them, may be created so as to be composed of color combinations and/or include various patterns that constitute signals for which these techniques offer enhanced recognition capability. Objects can, for example, be discriminated from background clutter. Likewise, logos can be discriminated from other package or label image content.

DETAILED DESCRIPTION

Figure 1:
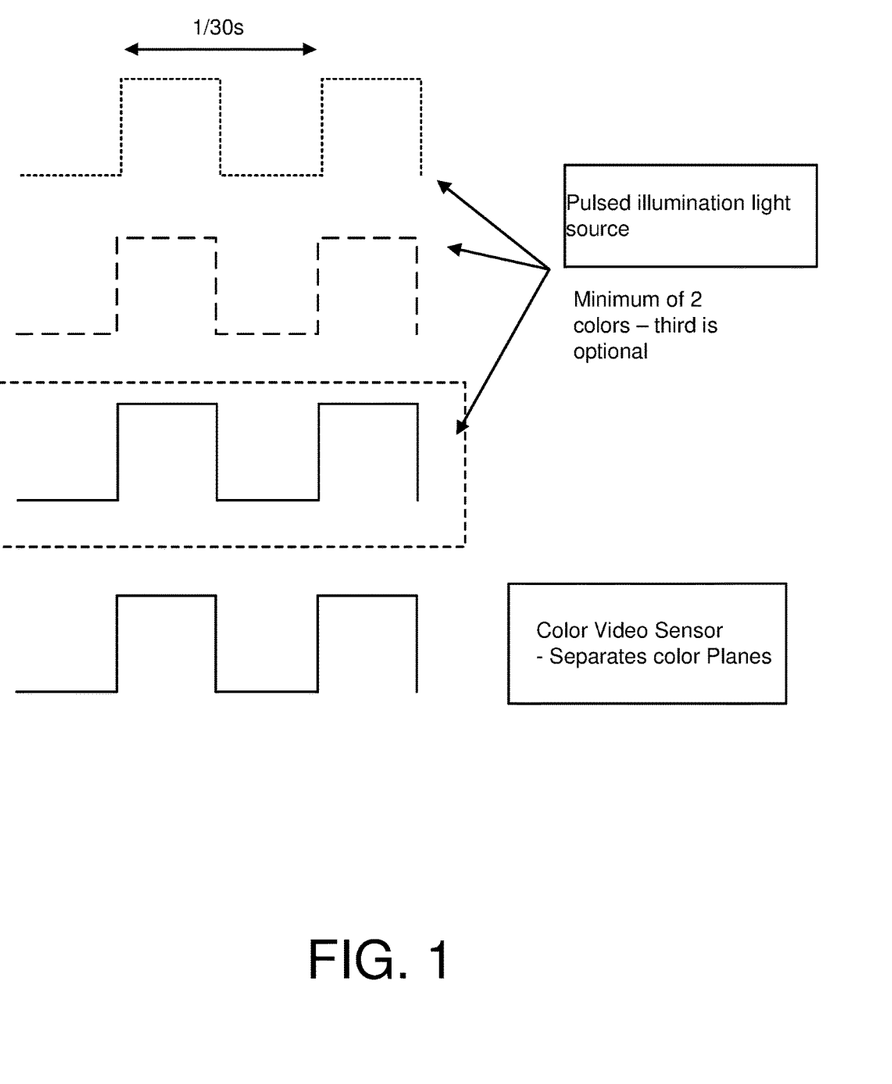
FIG. 1 is a diagram illustrating pulsed illumination and capture of image signals in a color sensor enabling decoding or recognition of signals from chrominance channels.

FIG. 1 is a diagram illustrating pulsed illumination and capture of image signals in a sensor to enable decoding of signals from chrominance channels. In this example, pulsed red and green colored illumination is synchronized with a video color sensor. For example, the top two waveforms illustrate pulsed red and green illumination, respectively. This allows red and green color planes to be read out from the video color sensor.

When a package is moved past the capture device, it has low motion blur since a short illumination exposure time is used. The red frame and green frame are synchronized in time, so a signal encoded in chrominance can be detected by subtracting the two color planes. See U.S. Pat. No. 8,199,969, and US Patent Application Publication 20100150434, incorporated above. See also, US Patent Application Publications 20110212717 and 20130195273, and application Ser. No. 13/888,939 by John Lord et al., describing various arrangements for capturing images under different illumination and combining the images to enhance signal detection and recognition, including for the specific case of out-of-phase signals disclosed in 20100150434.

This maximizes the watermark signal and minimizes interference due to the cover image.

$$wmConv = redFrame - greenFrame \qquad \text{equation 1}$$

A barcode could be detected by adding the color planes as follows:

$$barcodeConv = redFrame + greenFrame \qquad \text{equation 2}$$

Different variants of this basic design are possible, to get the best compromise between sampling rate and cost using color. To minimize cost and increase sampling rate, a monochrome sensor could be used instead of a color sensor as shown in FIG. 2.

Figure 2:
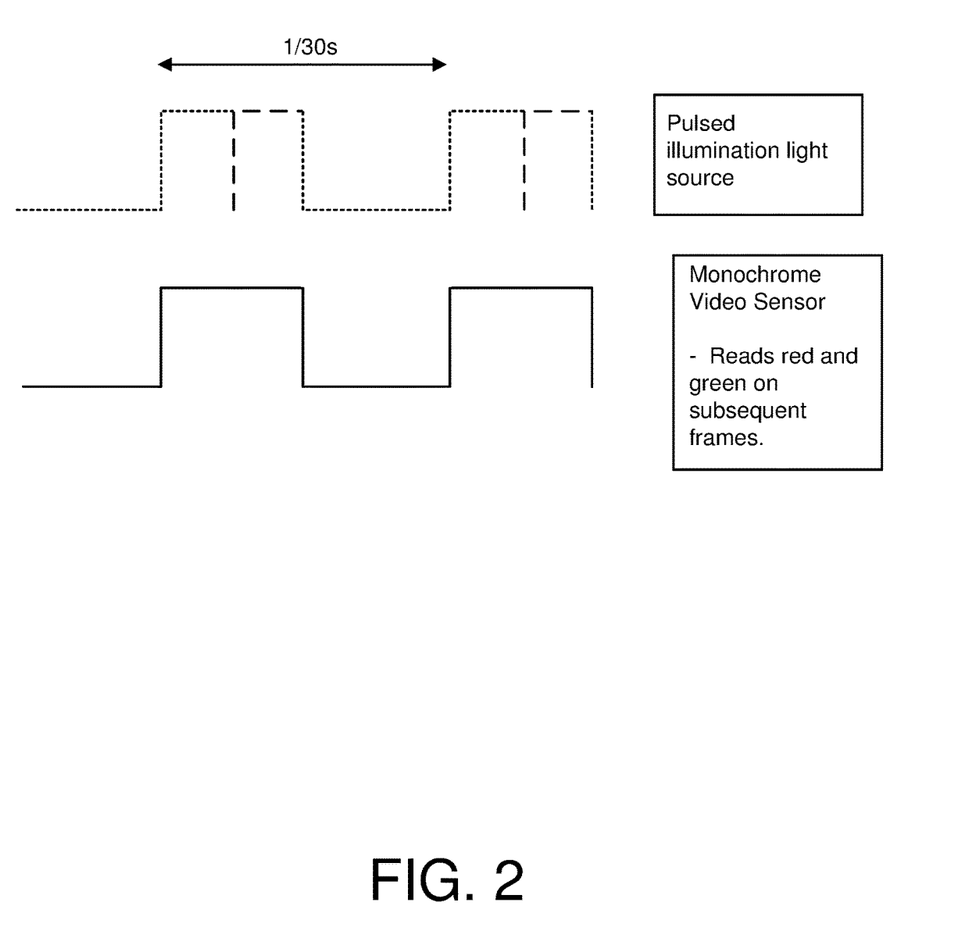
FIG. 2 is a diagram illustrating pulsed illumination and capture of image signals in a monochrome sensor enabling decoding or recognition of signals from chrominance channels.

FIG. 2 is a diagram illustrating pulsed illumination and capture of image signals in a monochrome sensor enabling decoding of signals from chrominance channels. One approach to getting color capability with a monochrome sensor is to capture distinct image signals during separate time periods when different color sources are illuminated. This generates image signals comprising at least partial frames, each in a different color of the illumination. A signal detector then reads the data signal encoded in these distinct images (e.g., using techniques of US 20100150434). For example, the monochrome sensor of FIG. 2 captures a red frame followed by a green frame of an object in which a digital watermark is encoded, out-of-phase, in two chrominance channels. The pulse shown with a short dashed line represents red illumination, for example, while the pulse shown with a longer dashed line represents green illumination. If the frames are aligned, then the two planes can be subtracted to reduce image interference and increase signal strength, as in equation 1.

A number of other combinations are possible. The following provides some additional examples.

Method 2A: 3 LEDs—Red, Blue, Green

In this embodiment, the imaging device has red, blue and green LEDs and a controller configured to flash (i.e., turn on and off) LEDs fast enough to appear white and capture one frame at each color. We have observed that flashing at 200 Hz is fast enough to appear white, and thus is satisfactory to avoid annoying the user of the device. This imaging device operation provides image signals from which a detector decodes signals encoded in chrominance channels better than images provided by scanners with just red illumination. The reason for this is that the signal encoded in the object in any color channel is detectable in the resulting image captured of the object under this illumination. For instance, this approach allows the digital watermark signal to be measured in magenta and yellow ink as well as cyan.

Method 2B: 3 LEDs—Red, Blue, Green

In this approach, the controller of the imaging device is configured to turn off blue and green for short period, leaving red on, while an image is captured. This makes the illumination look constant white to the user. It has almost identical performance to red only detection.

Method 2C: 2 LEDs—One White, One Red

In this approach, the controller of the image device is configured to only turn off the white illumination when the frame is to be captured by the sensor. This makes the illumination look constant white to the user. It has almost identical performance to red only illumination.

Figure 3:
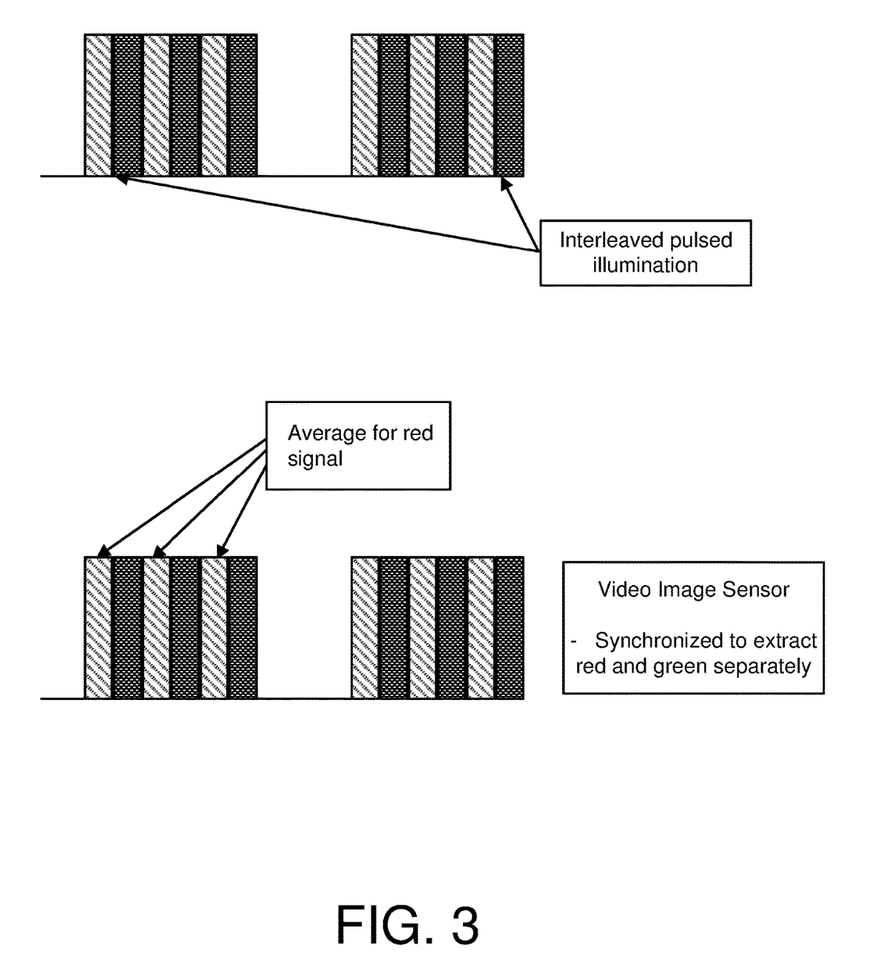
FIG. 3 is another diagram illustrating pulsed illumination and capture of image signals, where illumination in different colors are interleaved in time and coordinated with image capture timing.

Another example is to interleave the color illumination on a shorter time scale as shown in FIG. 3. FIG. 3 shows pulsed color illumination and capture with a monochrome sensor. The red illumination and capture are illustrated with single-hatching, and the green illumination and capture are illustrated with cross-hatching. This approach allows the red and green planes to be aligned, since they are captured at the same time while using the monochrome sensor.

In this example, the interleaving of 2 color LEDS at a high temporal frequency minimizes the spatial shift of a moving object captured by the sensor. The implementer should preferably choose 2 of the 3 colors available in the print with maximum magnitude signal but opposite polarity. For example, red and green planes are subtracted to reduce interference due to cover image. Red and green LEDs will illuminate an object so that a digital watermark detector extracts the digital watermark in the red and green color planes captured of an object. This digital watermark is embedded in tweaks of cyan and magenta ink, respectively. The magenta tweak is made in the opposite direction to red to minimize visibility of the digital watermark in the printed image. Cyan ink absorbs red illumination, Magenta ink absorbs green illumination, and Yellow ink absorbs blue illumination. Thus, in each of these pairs of illumination and colors, changes made to encode a signal in the color are readable in images captured with the illumination that the corresponding ink color absorbs.

Ink and printing technology is just one way of applying image information to an object. The same concept applies to other materials bearing pigments, and methods for constructing objects composed of these materials, such as molding, deposition, etching, engraving, laminating layers, etc.

This concept may be extended in various combinations using the absorbance, reflectance and transmittance properties of certain colors and materials in response to illumination sources. By coordinating illumination, filtering, and sensors that operate in particular wavelengths (frequency bands), the image device is configured to detect signals in particular wavelengths (frequency bands), and not others. Objects are constructed to include materials that absorb or reflect light in wavelengths in which signals are conveyed. The concept also applies to fluorescence of materials in response to radiation in certain wavelengths. In this case, illumination sources are selected to cause emission of light bearing signals in wavelengths captured by the sensor. In all of these embodiments, these signals may or may not be visible to the human under normal, ambient lighting conditions, yet are visible to the image device through coordinated capture and combination of channels, as appropriate, to discriminate the signal being sought.

Coordinated capture under these types of configurations also enables the discrimination of signals. In particular, post processing of the image channels amplifies desired signals and removes or suppresses unwanted signals. As explained, subtraction of different image frames under varying capture conditions of the same target reduces highly correlated components and amplifies the out-of-phase components. For example, highly correlated components in video frames captured with object scanners are the background components or static components, whereas a moving foreground object is retained. In addition to lighting paired with color channels, the motion of some elements in relation to the lack of motion of other elements in the image provides another signal discriminator. The weighted addition and subtraction of signal elements under these varying capture conditions discriminates desired from un-desired signals.

Addition of different frames under varying conditions amplifies common components. The selection of the varying conditions provides a means to limit each of the separate frames to capture of particular channels of information, thereby filtering out unwanted image signals. Then, the combination of these remaining channels amplifies the desired signals, such as bar codes, watermarks or objects for object recognition operations.

Within the broader realm of reflectance, absorbance and transmittance, another attribute to exploit in coordinated capture is the transparency of materials to certain wavelengths of light, including infrared or UV wavelengths. Transparency of material to radiation in a range of wavelengths is measured in terms of its transmittance of that radiation. Materials with higher transmittance to radiation are transparent to it. Some inks or plastics are IR transparent, and others not (e.g., ABS plastic is completely IR transparent, even black ABS plastic). Also, certain colored inks are IR transparent. Thus, in various embodiments, a barcode or digital watermark signal is printed or otherwise formed in a material layer hidden underneath a printed layer (such as a layer of an object printed in black ink underneath an overlaid image printed with colored pigmented inks or materials in 3D printing), or inside the casing or plastic packaging of an object.

This technique of placing signals within layers of an object works well with 3D printing. To facilitate reading, the layer with an image based code signal is printed in a flat layer. One or more layers may then be applied over that layer, such as packaging, protective seals, or layers from a 3D printer providing more complex (non-flat) structure. The signal bearing layer is read by illumination through other layers, even where those layers add complex surface structure, packaging, or additional layers of printed information.

In the latter case, the ability to separately image layers of 2D codes in the depth direction relative to the viewpoint of a reader provides a means of encoding and reading 3D codes, based on separately imaging layers with corresponding capture conditions for each layer.

A signal bearing layer in such a 3D configuration may be a metal pattern or alternative plastic layer under a surface finish which is transparent to the wavelength of radiation (light or any electromagnetic) used to read that layer. A hidden inner pattern, particularly on a flat inner layer, allows for object orientation and pose determination of an object, even where that object has a complex surface pattern bearing other types of information and imagery. The flat layer provides a reference plane, and the pattern on that reference plane enables image processing of images captured of the pattern to compute the object orientation and pose relative to the camera. The reference pattern may be a registration grid or more sophisticated digital watermark synchronization pattern as disclosed in U.S. Pat. No. 6,590,996, incorporated above. Pattern matching and detection techniques may be used to discern the orientation of the reference pattern.

This type of reference pattern facilitates a variety of functions. One function is as a reference pattern for a user interface control device, where a camera captures images of the reference pattern. Image processing in a programmed device or dedicated circuitry calculates the position and orientation of the reference pattern to capture gestural movement of the camera relative to the object, or the object relative to a fixed camera, from frames of images captured by a camera during the movement. A related function is for proximity sensing, as the reference pattern may be used to compute distance of a camera from the object. This reference pattern in the hidden layer maybe captured using IR illumination and a camera or stereoscopic cameras, for example.

These types of functions for determining object position, distance and object identity and related metadata in a machine readable data code layer, may be used in a variety of machine vision applications. Some examples include robotics, where robots navigate around, and manipulate objects with such hidden identification layers. Additional applications include game console controllers, mobile phone—object communication and interaction, interaction between wearable computing devices and objects, low cost implementation of the Internet of Things in which hidden layer codes of 3D objects provide links to network services through the use of ubiquitous mobile devices with cameras (like smartphones, Tablet PCs wearable computers, etc.).

An IR barcode or watermark scanner can read the hidden layer within an object without any data embedding process required. The scanner illuminates the target with IR illumination, captures images, and extracts the desired signal from those images, optionally employing circuitry or software to produce a weighted combination or subtraction of frames to discriminate the target signal from unwanted signals.

In other embodiments, a pulsed light-source cycles R, G, B then RGB together. The net effect is of white to the user, but with image sensor synchronization, each color is extracted separately from the stream of image frames obtained from the scanner.

Similarly, in related embodiments, the pulsed illumination is generated with partial power and full power for each color, with, for example, LED powers alternating between 1.0*R+0.5*G then 0.5*R+1.0*G.

Subtracting the frames still yields color information:

$$2*(1.0*R+0.5*G)-(0.5*R+1.0*G)=1.5*R$$

$$-(1.0*R+0.5*G)+2*(0.5*R+1.0*G)=1.5*G$$

In other embodiments, NIR and IR illumination sources are added and modulated in addition to a steady white light source. A typical silicon CMOS or CCD monochrome camera (or color camera) is sensitive to NIR/IR, thus allowing IR responsive materials to be detected in the image signals produced by the camera. In one arrangement, the IR blocking filter is removed from (or not installed) in front of the camera for this application.

Also, often IR can be observed in the blue and red channels of images captured in low-cost color CMOS cameras. In particular, IR energy is captured as blue and/or red in the sensor and manifested in the blue and/or red channels. For instance, a black object that is providing IR energy to the sensor will appear black to humans, but appear purple in the image of the object captured by sensor in which the IR energy is captured, at least in part, in the blue and red sensors. This IR response of "normal" color cameras also proves useful for extraction of IR illuminated image information without needing special camera devices (i.e. with sensors designed particularly for IR). The effect is due to the IR-blocking filter not extending far enough to longer wavelengths, and the individual pixel R, G, and B bandpass filters not having IR blocking response (or limited blocking).

By exploiting these attributes of certain color sensor arrangements, one can construct embodiments of devices and associated image processing circuitry and software that can capture and detect signals in IR layers without a dedicated IR sensor. The above example of a layer of an IR illuminated material that is behind another layer that has high IR transmittance can be implemented using an IR pulsed illumination. Alternating frames, captured with and without IR illumination may be subtracted to discriminate the IR based signal.

Some Si CMOS phone cameras have photo-response outside of the normal visible RGB range. One example is that IR/NIR is not filtered well by the red and blue pixel filters, even when there is the usual IR cut filter in-front of the camera die. For example taking a picture of the lit charcoal shows a very strong blue and red signal even though to the Human Visual System (HVS) it appears almost black. As another example, a BBQ lighting chimney, which again is not visibly emitting photons, appears purple due to the IR/NIR energy being captured in red and blue sensors of the phone camera. This energy is not being filtered by IR/NIR filtering.

This characteristic is useful for IR/NIR signal capture with suitably selected camera devices, including general purpose phone cameras or object scanners, like barcode scanning equipment. The effect varies by make of Si imaging sensor (and thus devices that include them). Some cameras have better bandpass IR-cut filters, others less-so. The latter enable IR signal reading with the color sensors as described above.

Similarly, the same approaches may be implemented in cameras with some UV bleed through the pixel filters to other color channels. Si sensors typically have poorer response at UV and short UV. However, there are extended UV photodiodes, such as those by Hammamatsu, which are direct photon capture, not using phosphors. Such illumination sources may be used in combination with photon capture sensors to detect UV signals.

Table 1 below provides some examples of imaging device configurations to illustrate approaches compatible with detecting signals in chrominance or IR/UV channels (where corresponding illumination sources are integrated in the design as described above). In the case of white light composed a mixture of various colors, imaging device is configured for chroma signal reading using a color filter or a color sensor that enables separation of color channels from the light. Monochrome sensors cannot capture images in separate color channels in this case.

In the case of a single color illumination, like red in barcode scanning devices, the chroma signal may be read from the image captured by a monochrome sensor, as it is red color plane image.

The selective illumination of different colors enables chroma signal compatibility for either color or monochrome sensors. In the latter case, color planes are segmented temporally, enabling chroma signal reading from these temporally segmented image signals. The temporally segmented images may correspond to frames, portions of frames (e.g., rows), or combinations of frames or sub-parts of frames (e.g., rows illuminated with similar illumination aggregated from different frames) etc. as explained further below, in the case of rolling shutter implementations.

TABLE 1

| Illumination | Filter | Sensor | Chroma Signal Compatibility |
|---|---|---|---|
| White | Red | Monochrome | Yes |
| White | None | Color Sensor | Yes |
| Red | None | Monochrome | Yes |
| Pulsed Colors (temporally separate) | None | Monochrome | Yes, with control to capture image of object illuminated under color or colors corresponding to chroma signal |

Figure 4:
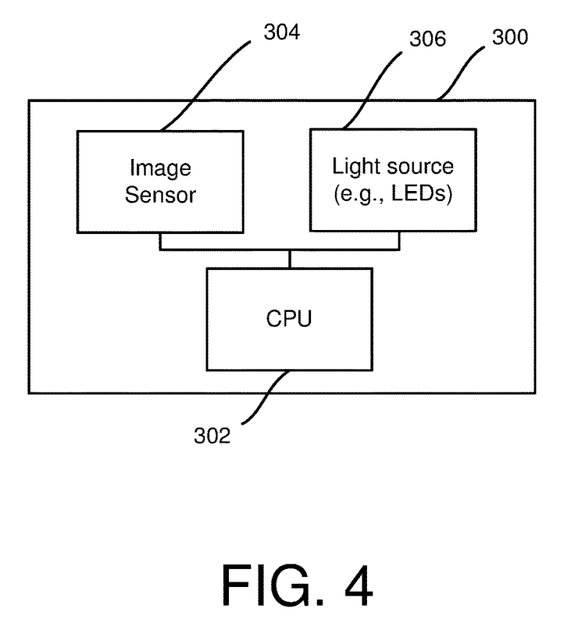
FIG. 4 is a diagram illustrating a device configuration for coordinated illumination and image capture under control of a processor.
Figure 5:
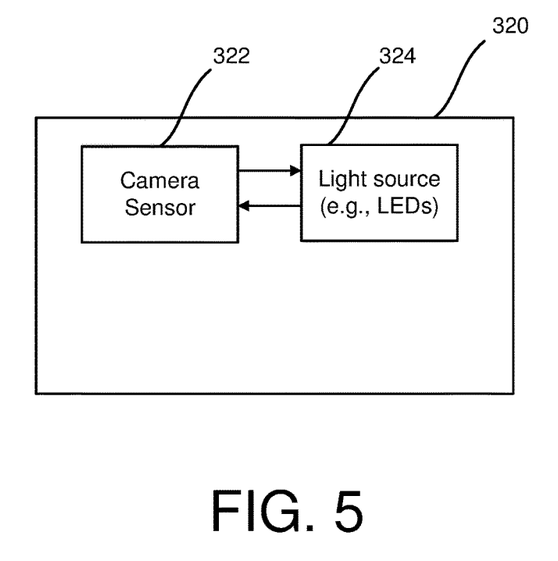
FIG. 5 is a diagram illustrating a device configuration for coordinated illumination and image capture in which light source and sensor communicate signals to each other.

FIGS. 4-5 are diagrams of imaging devices illustrating configurations for controlling illumination and image capture. There are a variety of ways to implement a controller for coordinating illumination and capture, and we highlight a few examples of controller configurations here. FIG. 4 is a diagram illustrating a configuration of a device 300 in which the controller may be implemented as instructions executing in a processor 302, such as a CPU or other processor (e.g., DSP, GPU, etc.). Under control of software or firmware instructions, the programmed processor communicates instructions to an image sensor 304 and illumination source 306. The CPU, for example, issues instructions to the camera and illumination source, causing it to turn on and off. In one approach, the processor is programmed to instruct the illumination source to turn/on off different color LEDs, as the image sensor captures frames.

FIG. 5 is a diagram illustrating a configuration of another device in which there are direct connections carrying control signals from illumination source to image sensor, and from image sensor to illumination source. These control signals enable the device to turn on/off different illumination sources in coordination with image capture. The control signals may be one-way, two-way, and can originate from either device. For example, the illumination source can provide control signals indicating when it is activating different color LEDs, and the image sensor sets its capture timing to capture image frames or rows of a frame corresponding to the time periods when different color LEDs are illuminated. As another alternative, the image sensor provides control signals indicating its capture timing (e.g., the beginning/end of frame capture), and the illumination source turns on/off different color LEDs to coincide with the illumination periods of these LEDs. Each of the components can also send direct signals to the other, telling it to initiate capture or turn on/off LEDs.

A controller in the configuration of FIG. 5 may also include a programmed processor, as described for FIG. 4, for providing similar control instructions. It has the advantage that the processor can take advantage of the lower lever circuitry between the illumination and sensor for carrying out the synchronization signaling without delays in communication between the programmed processor and lighting and image sensor components.

Alternatively, a controller in a configuration of FIG. 5 may be implemented in digital logic circuitry, such as FPGA, ASIC, etc.

The controller may be integrated into a signal detector or implemented as separate circuitry, software instructions, or a combination.

The signal detector is designed to detect, extract and where applicable, read data from, the particular signal being sought, such as a barcode, digital watermark, pattern or other signal recognition feature set Like the controller, the signal detector also may be implemented in digital logic circuitry, in software executing on one or more processors, or some combination. Various types of detectors are known and described in the documents incorporated by reference. Thus, we do not elaborate further on their implementation.

The above approaches are illustrated with examples of LEDs. Various types of LEDs may be used. LEDs are most common and offer lower cost options, and can be switched on/off at speeds needed to implement the above approaches. However, other types, such as OLEDs, may be used as well. It is also possible to implement these approaches with other types of light sources, like lasers, multi-spectral lighting, etc.

The image sensors, likewise, can be implemented using a variety of alternative image sensor components. The sensors, for example, may be implemented with 2-dimensional (2D) CCD or CMOS monochrome or color image sensor chips. Also, the above approaches employ video sensors. Timing parameters that impact capture of image frames include the frame rate and shutter speed. The frame rate is the rate at which the sensor produces time-distinct images called frames. The shutter speed is the length of time that a camera's shutter is open.

The above approaches accommodate rolling shutter operation. A rolling shutter is a method of image acquisition in which each frame is recorded by scanning across a 2D frame horizontally or vertically. A rolling shutter is in contrast to a global shutter in which the entire frame is exposed in the same time window. For example, in a rolling shutter, as the 2D image sensor array is being exposed to light reflected from an object (e.g., light from the device's light source), the rolling shutter effect causes light sensed at rows (or columns) of the sensor array to be recorded over different time periods. For example, in the above approaches, if different color light sources are switched over the frame exposure period, different rows receive light from the different illumination sources. This rolling shutter effect can be accommodated by coordinating image capture with a frame rate and shutter control so that a sufficient number of rows of any frame have been illuminated by desired light source or sources.

For more information on illumination and capture in rolling shutter modes and associated signal detectors, please see our co-pending application Ser. No. 13/888,939 and US Patent Application Publication 20130195273, which are incorporated by reference above. These documents describe operating LEDs (or other light sources) of differing wavelength ranges in coordination with exposure intervals of sub-parts of video image frames (e.g., rows of each frame exposed under different illumination).

The generic nature of the configurations of FIGS. 4-5 was intended as it is anticipated that coordinated illumination and image capture techniques described and incorporated into this document will be implemented in a variety of imaging devices or multi-purpose devices with imaging capability. In the former category, examples of imaging devices include barcode scanners (either fixed or handheld), cameras, document scanners, wearable cameras, video equipment, etc. In the latter category, examples of multi-purpose devices with imaging capability include smartphones/camera phones, tablet PCs, PCs in various form factors (desktop, laptop, etc.), wearable computers, etc.

Re-capping methods described above, FIG. 6 is a flow diagram illustrating a method for processing of image signals to prepare for data extraction or recognition operations, after coordinated illumination and capture of the image signals. The data extraction and recognition operations use image signals captured of an object in different wavelength ranges (e.g., color channels). The frames or parts of frames captured under different illumination, for example, are obtained (400). These frames may be obtained through a software interface (API) to the image sensors, or may be obtained by digital processing circuitry in communication with the image sensors.

Figure 6:
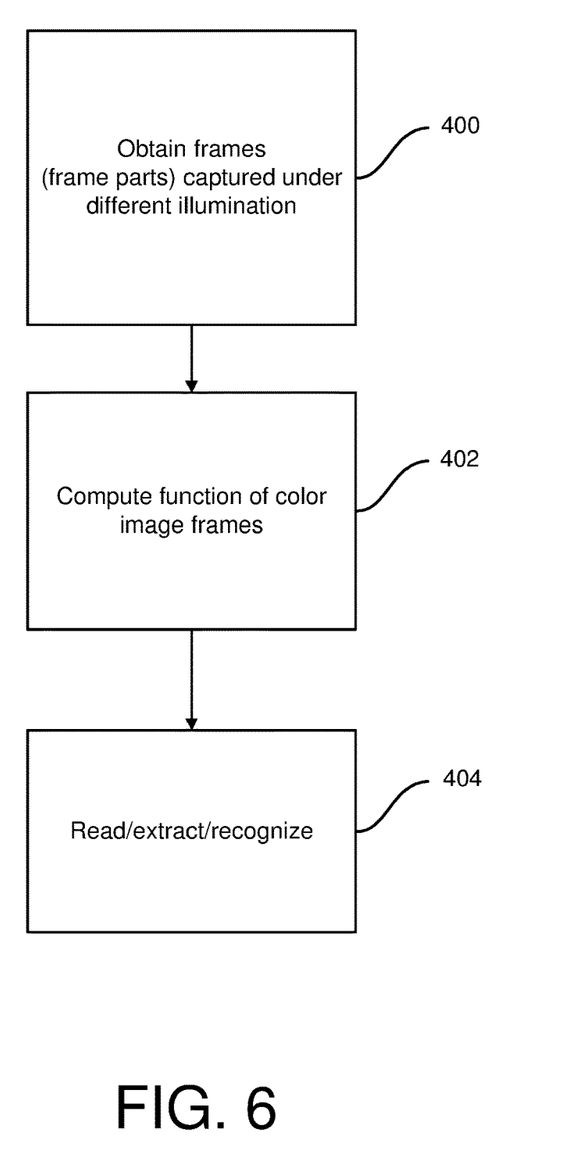
FIG. 6 is a flow diagram illustrating a method for processing of image signals to prepare for data extraction or recognition operations, after coordinated illumination and capture of the image signals.

Digital logic circuitry, a software application executing in a programmable processor, or some combination of both, then combines these image frames or frame parts using a function that improves signal detection recovery by boosting the signal of interest relative to the other image content (402). Images of an object captured under similar illumination may be added to increase signal to noise ratio. As described above, out-of-phase signal encoding techniques make opposite adjustments to at least two color channels. By subtracting these color channels, the out-of-phase signals constructively combine, while the other image content is reduced, increasing the signal to noise ratio. The operation represented in equation 1 is an example of this type of function. Where the same signal is present in different color channels, the color channels may be combined to boost the signal, as noted in the example of the barcode above in equation 2.

This type of signal combination is not always required where signal recovery can be achieved successfully from a single color channel. For example chroma based digital watermarks may be fully decoded from a single color channel, even if out of phase encoding is used to reduce visibility of the digital watermark. The out-of-phase relationship of the signals causes them to cancel each other from the perspective of the human visual system.

After these operations, signal extraction or recognition operations proceed (404). These operations include, but are not limited to digital watermark detection and data extraction (also called watermark detecting or reading), barcode reading, pattern recognition, feature extraction and matching for object or image recognition, etc.

Additional signal gain can be achieved by pulsing light onto on object and capturing frames under illumination, and in the absence of illumination pertinent to the signal being sought. Unwanted background clutter can be removed by subtracting frames. Absence of illumination pertinent to a signal of interest may include a configuration where there is no supplemental illumination provided by the capture device, or where illumination is applied, but in a color in that the signal of interest does not have.

The above examples primarily cite printed objects as the target of signal detection. Yet the techniques apply to a wide range of objects, and layering of materials within an object. This layer provides an effective means of marking objects at layers below the outer surface of an object. As such, the techniques may be used to include machine readable signals within packaging, documents (including payment and identity tokens or credentials), consumer goods, etc. 3D printing methods may be used to produce objects with internal layers with machine readable codes.

The above techniques also apply to signal detection or recognition of images captured from a display device, such as a video display, TV, monitor or display screen of a mobile phone or tablet PC. In some configurations, the display device may provide controlled illumination to facilitate detection and recognition of signals and objects displayed on the display screen.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for encoding and associated detector for decoding image based data signals may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The particular combinations of elements and features in the above-detailed embodiments are exemplary only; the interchanging and substitution of these teachings with other teachings in this and the incorporated-by-reference patents/applications are also contemplated.

We claim:

1. A method for watermark signal detection comprising:
obtaining image frames, each captured under different color LED illumination, including at least a first frame captured under a first visible color LED illumination, and a second frame captured under a second, different visible color illumination;
combining the first and second frames to produce a combined frame in which signal to noise ratio of a digital watermark signal encoded in different color channels is increased; and
performing watermark signal detection on the combined frame, wherein the watermark signal detection comprises detection of a synchronization pattern followed by extraction of data from pixels of the combined frame based on detection of the synchronization pattern.

2. The method of claim 1 wherein the first and second frames are captured under pulsed illumination in which two or more different color light sources are selectively illuminated.

3. The method of claim 1 wherein the different color LED illumination comprises pulsing of different color LED light sources in succession at a rate sufficient for the light source illumination to appear white to a user.

4. The method of claim 2 wherein the first and second frames are combined to boost out-phase watermark signals in distinct chrominance channels.

5. The method of claim 3 wherein pulsing comprises selectively turning off light sources while a first light source remains on to capture an image frame under illumination of the first light source.

6. The method of claim 3 wherein the light sources include a white light LED and another LED of a first color, and pulsing comprises selectively turning off the white light LED to capture an image frame under illumination of the first color.

7. A method for watermark signal detection comprising:
obtaining image frames captured under different visible color LED illumination, wherein the different visible color LED illumination comprises pulsing of different color LED light sources in succession at a rate sufficient for the pulsing of illumination to appear white to a user;
from the image frames, separating an image signal corresponding to a channel of illumination corresponding to one of the light sources, and
performing a watermark signal detection on the image signal corresponding to the channel of illumination, wherein the watermark signal detection comprises detection of a synchronization pattern followed by extraction of data from pixels of the image signal corresponding to the channel of illumination based on detection of the synchronization pattern.

8. The method of claim 7 wherein a layer of an object illuminated by IR is captured and the signal detection is performed on a signal conveyed in an IR channel.

9. The method of claim 8 wherein the IR channel is captured with visible color sensor.

10. The method of claim 8 wherein the layer is hidden under a layer of material that is transparent to IR illumination.

11. The method of claim 10 wherein the layer comprises a flat layer hidden under a non-flat layer of a 3D object, and provides a reference signal for determining orientation of the 3D object.

12. The method of claim 11 wherein the flat layer provides an image based code signal conveying variable encoded information.

13. An imaging device comprising:
an illumination source for providing pulsed illumination of different visible color LED illumination;
an image sensor for capturing image frames in coordination with the pulsed illumination, the image frames including at least a first frame captured under a first visible color LED illumination, and a second frame captured under a second, different visible color illumination;
a controller for coordinating the pulsed illumination and corresponding image capture; and
a programmed processor in communication with the image sensor for obtaining the image frames, the programmed processor configured to combine the first and second frames to produce a combined frame in which signal to noise ratio of a digital watermark signal encoded in different color channels is increased, and configured to perform watermark signal detection on the combined frame, wherein the watermark signal detection comprises detection of a synchronization pattern followed by extraction of data from pixels of the combined frame based on detection of the synchronization pattern.

14. The imaging device of claim 13 wherein the first and second frames are captured under pulsed illumination in which two or more different color light sources are selectively illuminated.

15. The imaging device of claim 13 wherein the different visible color LED illumination comprises pulsing of different color LED light sources in succession at a rate sufficient for the light source illumination to appear white to a user.

16. The imaging device of claim 14 wherein the first and second frames are combined to boost out-phase watermark signals in distinct chrominance channels.

17. The imaging device of claim 15 wherein pulsing comprises selectively turning off light sources while a first light source remains on to capture an image frame under illumination of the first light source.

18. The imaging device of claim 15 wherein the light sources include a white light LED and another LED of a first color, and pulsing comprises selectively turning off the white light LED to capture an image frame under illumination of the first color.

19. The imaging device of claim 14 wherein first and second frames are subtracted to produce the combined frame for watermark signal detection, and wherein the first and second frames are added to produce the combined frame for barcode signal detection.

20. The imaging device of claim 19 wherein the programmed processor is configured to perform a weighted subtraction of the first and second frames to produce the combined frame for watermark signal detection and a weighted addition of the first and second frames to produce the combined frame for barcode signal detection.

* * * * *